United States Patent [19]

McCarthy et al.

[11] Patent Number: 4,792,898

[45] Date of Patent: Dec. 20, 1988

[54] METHOD AND APPARATUS FOR TEMPORARILY STORING MULTIPLE DATA RECORDS

[76] Inventors: Donald F. McCarthy, 5541 S. Kline St., Littleton, Colo. 80127; Bradley E. Whitney, 308 Biscayne Ct., Lafayette, Colo. 80026; Patricia G. Orban, 105 S. Yarrow St., Lakewood, Colo. 80226; Randy A. Fout, 507 Backer, Longmont, Colo. 80501; Leslie A. Magor, 1359 Caledonia Cir., Louisville, Colo. 80027

[21] Appl. No.: 912,511

[22] Filed: Sep. 26, 1986

[51] Int. Cl.⁴ .................................................. G06F 7/00
[52] U.S. Cl. ....................................... 364/200; 364/900
[58] Field of Search ... 364/200 MS File, 900 MS File

[56] References Cited

U.S. PATENT DOCUMENTS 4,138,732 2/1979 Suzuki et al. .......................... 364/900
4,433,387 2/1984 Dyer et al. ............................. 364/900

Primary Examiner—Gareth D. Shaw
Assistant Examiner—Adolfo Ruiz
Attorney, Agent, or Firm—Woodcock Washburn Kurtz Mackiewicz & Norris

[57] ABSTRACT

Method and apparatus for temporarily storing multiple data records in a data processing system which includes a host computer, a cache buffer subsystem, and a magnetic tape drive subsystem. A microprocessor, acting in part as a cache manager, directs the transfer of data into and out of a memory in the cache buffer subsystem by setting up a fill address register, a drain address register, and a start of record address register. Through utilization of a CRC byte to detect errors without correction, and a stop bit to locate the end of a record, values of the registers are compared dependent upon whether there is data being filled or drained to properly manage the temporary storage of data within the memory.

6 Claims, 2 Drawing Sheets

METHOD AND APPARATUS FOR TEMPORARILY STORING MULTIPLE DATA RECORDS

CROSS REFERENCE TO RELATED APPLICATIONS

This application is related to an application, filed concurrently herewith, entitled "Method of Optimizing Host Computer Throughput in a "Multi-Record Buffer", Ser. No. 912,996, assigned to the assignee of the present invention, and incorporated herein by reference.

BACKGROUND OF THE INVENTION

This invention relates generally to data processing systems including a host computer coupled through cache buffer memory to a magnetic tape drive subsystem, and more particularly to a method and apparatus for temporarily storing multiple data records within the cache buffer memory such that overall system performance is optimized.

Various methods and apparatus have been utilized to temporarily store multiple data records in data processing systems having a host computer and a long term storage device such as a magnetic tape drive subsystem. Typical magnetic tape drives in the past were utilized in a start-and-stop mode of operation at approximately 50 inches per second. To increase performance for host throughput, a 100 inches per second "streaming" tape drive was developed. Data transferred from a 100 ips tape drive was developed. Data transferred from a 100 ips tape drive can transfer at twice the rate of a 50 inches per second tape drive. However a streaming drive has the disadvantage that it cannot stop (and later start) within the gap, but must do extra repositioning in order to be ready for the next start. This extra repositioning causes large delays for the host compared to a 50 inches per second start-and-stop tape drive. Therefore, if the host computer was too slow to reinstruct the tape drive subsystem, unnecessary stoppage and subsequent repositioning was required thereby reducing overall system performance.

Because the relative transfer rates of data through the typical host computer and tape drive subsystem differed substantially, the use of a cache buffer in such data processing systems became increasingly popular. The use of such cache buffers are well known and need little explanation. However, the management and control of such buffers in order to optimize overall data processing system performance has encountered many variations. One method uses two address registers, one for fill and one for drain, together with a counter which counts the number of bytes in the record. A record is prevented from overwriting another by never allowing the counter to exceed a maximum byte count.

Another method, compatible with IBM 3480 type data processing systems, utilizes a register to indicate the fill address while data is going into the buffer, an address indicative of the start of a record, and a drain address register for use in conjunction with a counter. During fill operations with such systems, the fill address register is used to feed a data record into the buffer, and the start of record address is utilized to indicate when the buffer is full at the time that the fill address register equals the start of record address. On the other hand, during drain of data, or when data is coming out of the buffer, such systems increment the drain address register and decrement the byte count obtained by the counter during the filling of the record, such that when the byte count equals zero the drain operation is finished. One major drawback to the use of such systems, however, is that the number of records available to be put into the buffer is limited by the memory space available in a microprocessor which manages the buffer, the memory space being allocated to the counter for keeping track of the number of bytes.

Yet another prior art approach utilizes a method similar to that described above, but also inputs a cyclic redundancy check (CRC) character for each data record in the microprocessor memory space after the indication of the number of bytes in the respective record. This method utilizes even more microprocessor memory space than the previously described method, and thus restricts the use of the microprocessor managing the buffer from other, more important operations.

Another prior art approach eliminates the use of a counter which counts the number of bytes in each record by placing a stop bit at the end of each record. That approach, while useful during read operations, is somewhat restricted during write operations due to its potential for overwriting of data records. It would therefore be desirable to provide controls for a cache buffer memory which optimizes performance of the data processing system by temporarily storing multiple data records in the cache buffer such that they may be readily accessed upon command by the host computer.

SUMMARY OF THE INVENTION

Accordingly, it is a general object of the present invention to provide a method and apparatus for temporarily storing multiple data records.

More specifically, it is an object of the present invention to provide a method and apparatus for temporary storage of multiple data records in a cache buffer used between a host computer and a magnetic tape drive subsystem.

It is another object of the present invention to provide a method and apparatus for temporarily storing multiple data records between a single storage device and a single host computer such that the usage of cache buffer memory space is optimized while preventing the overwriting of one data record by another.

Briefly, these and other objects of the present invention are accomplished in a data processing system which includes a host computer, a cache buffer subsystem, and a magnetic tape drive subsystem, by utilizing three address registers to prevent overwriting of data, a cyclic redundancy check (CRC) byte to detect errors without correction, and a STOP bit to locate the end of a record. Data input to the buffer, dependent upon whether the host computer commands a buffered mode or a synchronous mode, is controlled by a microprocessor acting in part as a cache manager. The microprocessor sets up the operation of a data transfer into or out of the buffer by setting up a fill address register, a drain address register, and a start of record address register. By further utilizing the CRC byte and the STOP bit at the end of each data record, the fill address register, drain address register, and start of record address register, can be compared dependent upon whether data is being filled or drained to properly manage the temporary storage of data within the buffer. In such a manner, the maximum size of a record is not strictly limited to a specific byte count, record boundaries in memory are not fixed since they can begin and end at any locations within the memory, and records larger than the buffer itself can be accommodated. The CRC byte also allows for real-time detection of memory address control errors.

These and other objects of the present invention will become apparent from the following detailed description of a preferred embodiment when considered in conjunction with the accompanying drawings wherein:

DETAILED DESCRIPTION OF A PREFERRED EMBODIMENT

Figure 1:
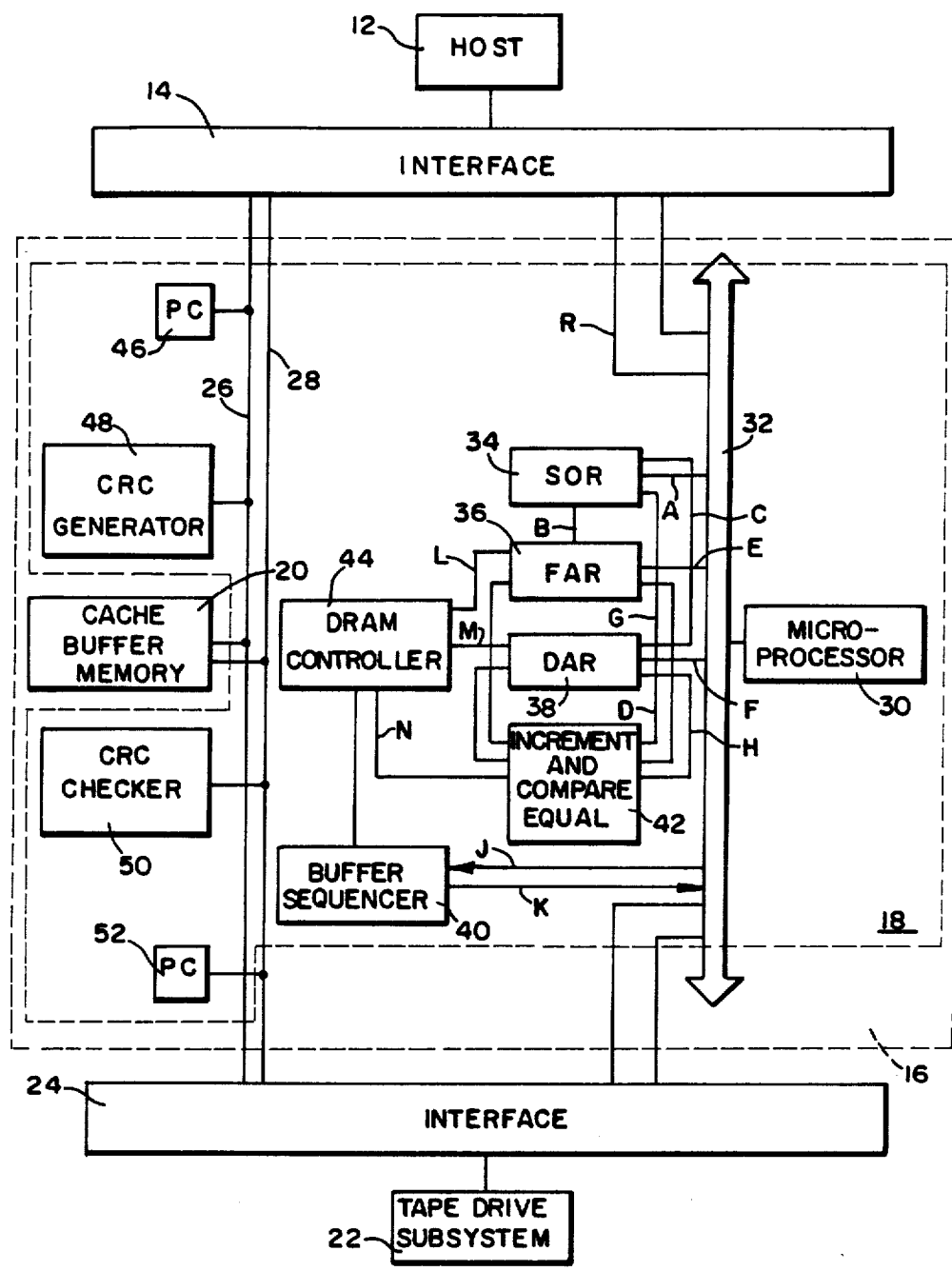
FIG. 1 is a block diagram of the apparatus according to the present invention including data, signal, and command paths.

Referring now to the drawings, wherein like characters designate like or corresponding parts throughout the several views, there is shown in FIG. 1 a data processing system according to the present invention. The data processing system shown includes a host computer 12 connected by an interface 14 to a cache buffer subsystem 16 having cache buffer controls 18 which manage a cache buffer memory 20 in order to temporarily store data transferred between the host computer 12 and a magnetic tape drive subsystem 22 coupled to the cache buffer subsystem 16 by an interface 24. Data transferred between the host 12 and the tape drive subsystem 22 may be temporarily stored in the cache buffer memory 20 through a fill data bus 26, and may be retrieved from the cache buffer memory 20 to the host computer 12 or tape drive subsystem 22 through a drain data bus 28.

Figure 2:
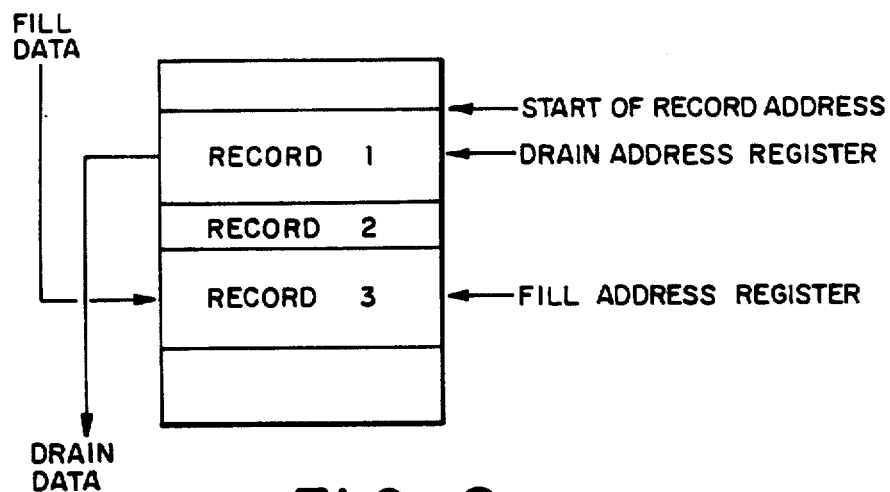
FIG. 2 illustrates the filling and draining of data from the cache buffer memory shown in FIG. 1.

The cache buffer controls 18 generally comprise a microprocessor 30 coupled by a microprocessor bus 32 to three address registers 34, 36, and 38, and a buffer sequencer 40. In a manner emulating an address interface to the microprocessor 30, the address register 34 is a start of record (SOR) address register which is utilized to indicate the start of record as illustrated in FIG. 2. As will be explained in greater detail with reference to FIG. 2, the register 36 is a fill address register (FAR), and the register 38 is a drain address register (DAR). The SOR 34 is connected to the microprocessor bus 32 by a signal line A, the FAR 36 by a signal line B, the DAR 38 by a signal line C, and to programmable array logic 42 which is used to increment and compare equal by a signal line D. The FAR 36 and DAR 38 are connected respectively to the microprocessor bus 32 by signal lines E and F, and to the increment and compare equal basis 42 respectively by signal lines G and H.

Implemented as a series of programmable array logic elements, the buffer sequencer 40 is coupled to the microprocessor bus 32 by signal lines J and K in order to receive commands from the microprocessor 30 and to send status pertaining to the generating of various data strobes and memory access. The buffer sequencer 40 is further coupled to a DRAM controller 44, which also receives signals from the FAR 36, DAR 38, and the increment and compare equal 42 respectively by signal lines L, M, and N. As will be explained in greater detail herein below the DRAM controller 44 is utilized to control the fill and drain of data going into the cache buffer memory 20 from the fill data bus 26 and the drain data bus 28.

Also contained within the cache buffer controls 18, connected respectively to the fill data bus 26 and the drain data bus 28, are a parity checker 46 and CRC generator 48, and a CRC checker 50 and parity checker 52. The parity checker 46, as is conventional, checks the parity of data coming into the fill data bus 26 either from the host computer 12 or tape drive subsystem 22, and the CRC generator 48 generates a cyclic redundancy code character which is utilized in accordance with the present invention as will be explained in greater detail below. Likewise, the CRC checker 50 and parity checker 52 are utilized to check data going out of the cache buffer memory 20 through the drain data bus 28. Parity checkers 46 and 52 may both comprise odd parity checkers as is typical. As is also conventional, the CRC generator 48 and CRC checker 50 may comprise exclusive OR circuitry in which each bit of data coming into or going out of the cache buffer memory 20 is exclusive OR'ed with one or more previously generated states and then clocked into a register. A unique character is thus generated for each data record, such that when the data record is read out of the cache buffer memory 20, each byte is clocked into the CRC checker 50 which determines whether a "matched pattern" or a CRC error results.

Referring now to FIG. 2, a description of the operation of a FILL cycle in accordance with the present invention will follow. As was explained more fully herein before, the FILL cycle refers to data going into the cache buffer memory 20, either from the host computer 12 or the tape drive subsystem 22. In those cases where data from the host computer 12 is to be temporarily stored in the cache buffer memory 20 the applicable submode of operation is referred to as HOST WRITE. On the other hand, in those remaining cases where data is to be temporarily stored in the cache buffer memory 20 from the tape drive subsystem 22, the submode of operation is referred to as TAPE READ.

In the HOST WRITE submode, a write command received by the microprocessor 30 from the host computer 12, through the interface 14 and a command signal line R, is relayed to the buffer sequencer 40 through the signal line J. The buffer sequencer 40 subsequently initiates a hand shake with the host computer 12 by activating a DATA IN STROBE, to which the host computer 12 responds by activating a DATA IN ACKNOWLEDGE when it has determined that valid data exists on the fill data bus 26 portion leading into the cache buffer memory 20. The DATA IN STROBE is then deactivated, and remains deactivated for the next FILL cycle as long as the DATA IN ACKNOWLEDGE is still active from the previous FILL cycle.

Figure 3:
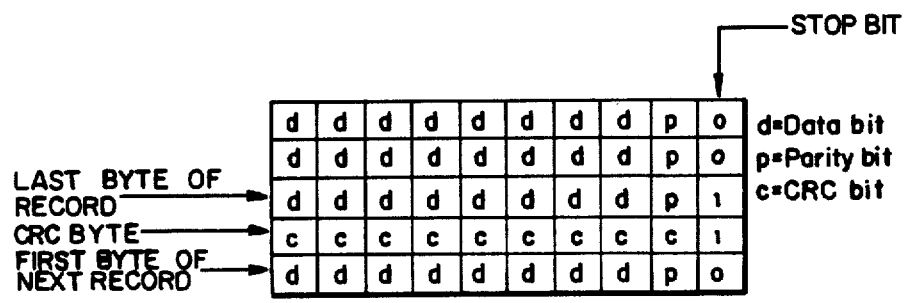
FIG. 3 illustrates the bit-sized detail of data records contained in the cache buffer memory shown in FIG. 1.

As shown in FIG. 2, when considered in conjunction with FIG. 1, the microprocessor 30 sets up the SOR 34, FAR 36, and DAR 38, respectively through signal lines A, E, and F. In this fashion, the microprocessor 30 thus enables the filling of the cache buffer memory 20. The FAR 36 address is subsequently sent to the cache buffer memory 20, which may comprise a conventional 256K dynamic random access memory, and a DRAIN/FILL CYCLE signal is activated by the buffer sequencer 40 to the DRAM controller 44. Data present on the fill data bus 26 is then stored in the cache buffer memory 20 at the address specified by the FAR 36. The CRC generator 48 also receives the data, generates a cyclic redundancy code character as modified thereby, and stores the CRC byte generated at the end of the data record as shown in FIG. 3. The address contained in the FAR 36 is loaded into the increment and compare equal block 42, with the incremented value being stored back in the FAR 36. Thereafter, the incremented value is compared to the value in SOR 34, if a SYNCHRONOUS/BUFFERED command relayed from the host computer 12 through the microprocessor 30 and input to the buffer sequencer 40 is set to a buffered mode, or if in the synchronous mode, is compared to DAR.

As is well known, in a buffered mode, data can be going into the cache buffer memory 20 for one record while data is going out of the cache buffer memory 20 for another record. In synchronous mode, on the other hand, only one data record is transferred into or out of the cache buffer memory 20, the synchronous mode being intended for records longer than the cache buffer memory 20.

If the comparison referred to above is equal (i.e., if the incremented value of FAR is equal to SOR or DAR as applicable), the buffer sequencer 40 activates a BUFFER FULL signal through the signal line K. This condition, in a buffered mode can only be reset by the microprocessor 30 activating a RESET FULL signal through signal line J. In other words, such an equality indicates that the cache buffer memory 20 is full. The buffer full condition in synchronous mode, on the other hand, may be reset by a DRAIN CYCLE signal from the buffer sequencer 40 to the increment and compare equal logic 42, or the microprocesor 30. If under such circumstances the cache buffer memory 20 goes full, another FILL cycle is not initiated by the activation of a DATA IN STROBE until the cache buffer memory 20 is not full.

The end of a FILL cycle occurs when in response to DATA IN STROBE, a DATA IN STOP command is activated by the host computer 12 instead of a DATA IN ACKNOWLEDGE. When DATA IN STOP is activated in response to DATA IN STROBE, a STOP bit as illustrated in FIG. 3 is stored with the data record in the cache buffer memory 20 at the address specified by the FAR 36. Thereafter, FAR is incremented and compared with either SOR or DAR, depending on whether in synchronous or buffered mode as commanded by the host computer 12. If the comparison is not equal, the cache buffer memory 20 does not go full, and the cyclic redundancy check character is subsequently stored in the cache buffer memory 20 at the address specified by FAR. FAR is incremented as before and compared with SOR or DAR, and if the comparison is equal, BUFFER FULL is set accordingly. A FILL DONE is then activated by the buffer sequencer 40 across the signal line K, which tells the microprocessor 30 that the FILL cycle is complete.

Under circumstances in which the FILL cycle pertains to a TAPE READ submode, data being read from the tape drive subsystem 22 and stored in the cache buffer memory 20, several differences in the above-described FILL cycle would take place. For example, instead of DATA IN STROBE being activated by the buffer sequencer 40 first, the tape drive subsystem 22 would have activated DATA IN ACKNOWLEDGE. The DATA IN STROBE is activated in response to DATA IN ACKNOWLEDGE instead of vice versa, and if the cache buffer memory 20 goes full, DATA IN STROBE is held active until such full condition goes away. At the end of the transfer, DATA IN STOP is activated by the tape drive subsystem instead of DATA IN ACKNOWLEDGE, and no data is sent with DATA IN STOP.

A DRAIN cycle, as explained hereinbefore, refers to data coming out of the cache buffer memory 20. In those cases where data is to be retrieved from the cache buffer memory 20 and transferred to the host computer 12, the applicable submode of operation is referred to as HOST READ. On the other hand, in those remaining cases where data is to be transferred to the tape drive subsystem 22, the submode of operation is referred to as TAPE READ.

In the HOST READ submode, a read command received by the microprocessor 30 from the host computer 12 is relayed to the buffer sequencer 40. The buffer sequencer 40 subsequently initiates a hand shake with the host computer 12 by activating a DATA OUT STROBE, to which the host computer 12 responds by activating a DATA OUT REQUEST. After the last byte of data has been transferred from the cache buffer memory 20 to the host computer 12, the buffer sequencer activates a DATA OUT END OF DATA signal.

As shown in FIGS. 2 and 3, the DAR is sent to the cache buffer memory 20 in response to the activation of the DRAIN/FILL cycle by the buffer sequencer 40 to the drain condition. Data is then sent to the host computer 12 via the drain data bus 28, after which the DATA OUT STROBE is activated by the buffer sequencer 40 to indicate that data is valid on the drain data bus 28. When the data transferred is captured by the host computer 12, the host computer 12 activates a DATA OUT REQUEST, in response to which the buffer sequencer 40 deactivates the data out strobe.

The DATA OUT STROBE remains deactivated for the next drain cycle as long as the DATA OUT REQUEST is still active from the previous DRAIN cycle. With the data just read from the cache buffer memory 20, the cyclic redundancy check character is modified by the CRC checker 50. The DAR address is loaded into the increment and compare equal 42, with the incremented value of DAR being stored back in the DAR 38. Thereafter, the incremented value of DAR is compared to FAR, and if the comparison is equal, the buffer sequencer 40 activates a BUFFER EMPTY signal through the signal line K. Such empty condition of the cache buffer memory 20 can only be reset by a FILL cycle, and another DRAIN cycle is not initiated until the cache buffer memory 20 is not empty (i.e., the DATA OUT STROBE is not activated).

The end of a DRAIN cycle occurs when the STOP bit stored with the last byte of data is read out of the cache buffer memory 20. DATA OUT STROBE is activated one last time, with the normal hand shake of DATA OUT request. DATA OUT END OF DATA is then activated indicating no more data is to be sent to the host computer 12. The value of DAR is incremented and compared with the value of FAR, such that if the comparison is not equal, the cache buffer memory 20 does not go empty.

As a result, the cyclic redundancy code character is then read out of the cache buffer memory 20 at the address specified by DAR. DAR is incremented as before and compared with FAR, and if the comparison is equal, BUFFER EMPTY is sent by the buffer sequencer 40 to the microprocessor. The cyclic redundancy code character is then sent to the CRC checker 50 to determine if a CRC error exists. If there is a CRC error, a CRC error signal is sent to the microprocessor 30. The buffer sequencer 40 then activates a DRAIN DONE signal for which tells the microprocessor 30 that the DRAIN cycle is complete.

Under conditions of the TAPE WRITE submode, the data transfer is driven by the tape drive subsystem 22 activating a DATA OUT REQUEST first instead of DATA OUT STROBE. In response to DATA OUT REQUEST the DATA OUT STROBE is activated and is held active even if the cache buffer memory 20 goes empty until such empty condition goes away. Finally, at the end of the data transfer, DATA OUT STOP is activated instead of DATA OUT STROBE.

To get around the problems of retrying a record, the SOR address is used for draining, and a copy of FAR is saved by the microprocessor 30 for retrying a FILL cycle. For example, if the DRAIN cycle being performed is a TAPE WRITE submode, SOR would be set equal to DAR at the start of the cycle. The DAR would be incremented for each byte of data being transferred, and at the end of the record, the STOP bit would be read with last byte of data, the cyclic redundancy code character thereafter being checked. The DAR would then be positioned to read the next record out of the buffer.

If, however, there was an error with the tape drive subsystem 22, and the record needed to be transferred again, the microprocessor 30 could simply load DAR with SOR, and start the transfer over again. Retrying a record for a FILL cycle (e.g., in TAPE READ submode) would encompass setting FAR to the address of the next free space in the cache buffer memory 20 at the start of the cycle. The microprocessor 30 would save the value of FAR for retry purposes before the transfer was started, and as each byte was received by the tape drive subsystem 22, FAR would be incremented. When the transfer was complete the STOP bit would be stored with the last byte of data, and the cyclic redundancy code character being stored thereafter. If, however, the data read from the tape drive subsystem 22 was in error, FAR could be reloaded with the value saved by the microprocessor 30 and the transfer restarted. It should be noted that to read out FAR, or to set DAR equal to SOR, or to set SOR, the filling and draining processes need to be disabled for a short time. This may be accomplished by the microprocessor 30 sending a DISABLE FILL/DRAIN signal to the buffer sequencer 40 across the signal line J.

What is claimed is:

1. A system for transferring a data record of an unspecified bit length into or out of a cache memory coupled between a host computer and a data storage device, whereby valid data including other such data records contained within the cache memory is incapable of being overwritten by a transferring of the data record into the cache memory, comprising:

cache manager measn, including a microprocessor and microporcessor bus means, for controlling the cache memory;

first register means coupled between said microprocessor bus means and the cache memory for storing start-of-record address, said start-of-record address defining an address within the cache memory beyond which new data cannot be stored without ovewwriting the valid data;

second register means coupled between said microprocessor bus means and the cache memory for storing a fill address;

third reigster means coupled between said microprocessor bus means and the cache memory for storing a drain address;

means, coupled to said second and third register means, for incrementing said fill and drain addresses stored therein, said fill address contained in said second register means being incremented as each bit of data contained within the data record to be transferred into the cache memory is transferred into the cache memory, each such incrementation yielding a new fill address, and said drain address contained in said third register means being incremented as each bit of data contained within the data record to be transferred out of the cache memory is transferred out of the cache memory, each such incrementation yielding a new drain address;

means, coupled to said first, second, and third register means, for selectively comparing said start-of-record, fill, and drain addresses stored therein, said comparing means comparing, during transfer of the data record into the cache memory, said fill address contained in said second register means to a selected one of either said start-of-record address contained in said first register means or said drain address contained in said third register means, and, during transfer of the data record out of the cache memory, to said drain address contained in said third register means, whereupon a first indication is sent from said comparing means to the host computer, during transfer of the data record into the cache memory, that a buffer full condition exists either when said fill address contained in said second register means is equal to said start-of-record address contained in said first register means or to said drain address contained in said third register means, or a second indication is sent from said comapring means to the host computer, during a transfer of the data record out of the cache memory, that a buffer empty condition exists when said fill address contained in said second register means is equal to said drain address contained in said third register means;

means for generating a cyclic redundancy check character for input to the cache memory appended to the data record being transferred into the cache memory;

means for generating a STOP bit for input to the cache memory appended to said appended cyclic redundancy check character; and data bus means coupling the host computer, data storage device, and cache memory for trnasfer of data therebetween.

2. A system according to claim 1, further comprising means for checking said cyclic redundancy check character.

3. A system according to claim 1, further comprising means for checking a parity bit input by the host computer between the host computer and tee cache memory and between the cache memory and data storage system.

4. A method for transferring a data record of an unspecified bit length into or out of a cache memory coupled between a host computer and a tape drive subsystem, whereby valid data including other such data records contained within the cache memory is incapable of being overwritten by a transferring of the data record into the cache memory, comprising:

(a) storing start-of-record address in a first register, said start-of-record address defining an address within the cache memory beyond which new data cannot be stored without overwriting the valid data;

(b) storing a fill address in a second register;

(c) storing a drain address in a third register;

(d) generating a cyclic redundancy check character for the data record to be transferred into the cache memory;

(e) storing the data record in the cache memory beginning at an address therein corresponding to said fill address, said stored data record having appended thereto said generated cyclic redundancy check character;

(f) generating a stop bit for said stored data record, said stop bit being appended to said appended cyclic redundancy check character;

(g) incrementing said fill address as each bit of data contained weithin the data record to be transferred into the cache memory is transferred inot the cache memory, each such incrementation yielding a new fill address;

(h) replacing said fill address contained in said second rgister with said new fill address;

(i) incrementing said drain address as each bit of data contained within the data record to be transferred out of the cache memory is transferred out of the cache memory, eahc such incrementation yielding a new drain address;

(j) replacing said drain address contained in said third register with said new drain address;

(k) comparing, during transfer of the data record into the cache memory, aid fill address contained in said second register to a selected one of either said start-of-record address contained in said first register or said drain address contained in said third register, and, during transfer of the data record out of the cache memory, to said drain address contained in said third register;

(l) indicating to the host computer, during transfer of the data record into the cache memory, a buffer full condition either when said fill address contained in said second register is equal to said start-of-record address contained in said first register or to said drain address contained in said third register;

(m) repeating steps (a) through (1) otherwise; and (n) indicating to the host computer, during a transfer of the data record out of the cache memory, a buffer empty condition when said fill address contained in said second register is equal to said drain address contained in said third register.

5. A method according to claim 4, wherein said comparison step compares said fill address contained in said second register with said start-of-record address contained in said first register when the host computer commands a buffered mode.

6. A method according to claim 4, wherein said comparison step compares said fill address contained in said second register with said drain address contained in said third reigster when the host computer commands a synchronous mode.

* * * * *

UNITED STATES PATENT AND TRADEMARK OFFICE
CERTIFICATE OF CORRECTION

PATENT NO. : 4,792,898
DATED : December 20, 1988
INVENTOR(S) : McCarthy et al.

It is certified that error appears in the above-identified patent and that said Letters Patent is hereby corrected as shown below:

Column 5, line 31, please change the word "microprocesor" to --microprocessor--.

Column 7, line 57, please change the word "measn" to --means--.

Column 8, line 59, please change the word "tee" to --the--.

Column 9, line 28, please change the word "rgister" to --register--.

Column 10, line 4, please change the word "aid" to --said--.

Column 10, line 31, please change the word "reigster" to --register--.

Signed and Sealed this

Sixth Day of June, 1989

Attest:

DONALD J. QUIGG

Attesting Officer     Commissioner of Patents and Trademarks